United States Patent [19]

Wireman

[11] Patent Number: 5,599,107
[45] Date of Patent: Feb. 4, 1997

[54] SELF-ALIGNING LINEAR BEARING

[75] Inventor: Alonzo Wireman, Sherman, Tex.

[73] Assignee: Reedrill Corporation, Denison, Tex.

[21] Appl. No.: 489,968

[22] Filed: Jun. 13, 1995

[51] Int. Cl.⁶ .................................................. F16C 29/12
[52] U.S. Cl. ............................................ 384/57; 384/31
[58] Field of Search ........................... 384/26, 31, 38–42, 384/57

[56] References Cited

U.S. PATENT DOCUMENTS

| | | | |
|---|---|---|---|
| 1,146,356 | 7/1915 | Simon et al. | 384/42 |
| 1,773,596 | 8/1930 | Michell | 384/38 |
| 2,062,991 | 12/1936 | Gartin | 384/40 |
| 2,525,712 | 10/1950 | Neighbour | 384/57 X |
| 4,702,621 | 10/1987 | Heinonen et al. | 384/38 X |
| 4,925,320 | 5/1990 | Foster et al. | 384/41 X |

*Primary Examiner*—Thomas R. Hannon
*Attorney, Agent, or Firm*—David H. Judson

[57] ABSTRACT

A self-aligning linear bearing for use with the feed column of a drilling rig includes a bearing block having a pivot shaft extending therefrom. A pivot block connected to a mounting plate of a drill head rotatably connects with the pivot shaft, enabling the bearing to rotate such that the bearing surfaces of the bearing maintain substantially full contact with the feed column despite forces moving the drill head and mounting plate away from or toward the feed column.

7 Claims, 2 Drawing Sheets

SELF-ALIGNING LINEAR BEARING

TECHNICAL FIELD

The present invention relates to drilling equipment, and more particularly to bearings for mounting a drilling head to the feed column of a drilling rig.

BACKGROUND OF THE INVENTION

Most drilling equipment uses a feed column having a drilling head mounted thereto. The drilling head is mounted on a plate which slides along the feed column allowing the drilling head to be lowered into or raised from the drilling hole. The mounting plate is mounted to the feed column using fixed bearing plates that prevent the mounting plate from being pulled away from the feed column and react against the movement generated by the forces of the drilling head feed system.

During normal operation of drilling equipment, a feed element attached to the mounting plate pulls the mounting plate up and down the feed column to cause the drilling action. The force used to pull the mounting plate down the feed column creates a moment of force causing the front of the drill head to pull away from the feed column. This moment of force causes the fixed bearing plates connecting the mounting plate to the feed column to form an uneven line of contact with the feed column. This line of contact is on the edges of the fixed bearing plates located at the front and rear of the mounting plate. This characteristic of the fixed bearing plate causes a plowing action between the bearing plate and the feed column and accelerates wear of both the feed column and bearing plate. This wear comprises a major maintenance factor in drilling equipment. Presently existing systems typically harden the fixed bearing plates to reduce wear, thus making the bearing plates much harder than the feed column. While this may improve wear of the bearing plates, wear on the feed column is not improved. Thus, an apparatus for reducing the amount of wear between the bearings of a mounting plate and the feed column of a drilling rig is needed.

SUMMARY OF THE INVENTION

The present invention overcomes the foregoing and other problems with a self-aligning linear bearing. The bearing uses a pivot block mounted to the mounting plate of a drill head and defines an opening through which a pivot shaft connected to a bearing block and bearings is inserted. The pivot shaft is rotatably connected to the pivot block enabling the bearing block and bearings to rotate with respect to the mounting plate. This enables the bearing surface of the bearing to maintain substantially full contact with the feed column despite any rotational forces exerted on the bearing mechanism due to rotation of the drill head and mounting plate.

The foregoing has outlined some of the more pertinent aspects of the present invention. These aspects should be construed to be merely illustrative of some of the more prominent features and applications of the invention. Many other beneficial results can be attained by applying the disclosed invention in a different manner or modifying the invention as will be described. Accordingly, other aspects and a fuller understanding of the invention may be had by referring to the following detailed description of the preferred embodiment.

A BRIEF DESCRIPTION OF THE DRAWING

For a more complete understanding of the present invention and the advantages thereof, reference should be made to the following Detailed Description taken in connection with the accompanying drawings in which:

FIG. 1 is a side view illustrating a drill head and mounting plate using the self-aligning linear bearings of the present invention; and FIG. 2 is an end view more fully illustrating the self-aligning linear bearings of the present invention.

DETAILED DESCRIPTION

Figure 1:
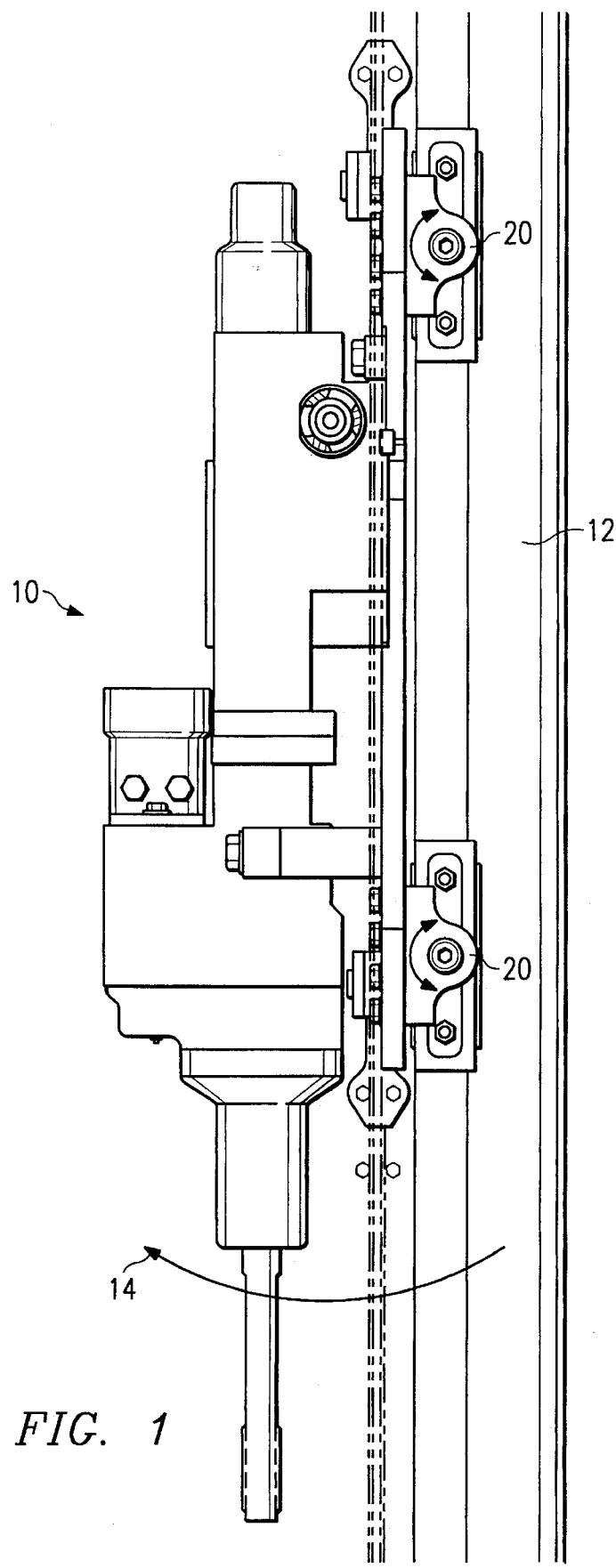

Referring now to the drawings and more particularly to FIG. 1, there is illustrated a side view of a drill head and mounting plate using the self-aligning linear bearings of the present invention. When a drill head 10 is fed into a drill hole, the forces involved in this operation ultimately generate a clockwise moment of force causing the front of the drill head to be pulled away from feed column 12 in the direction indicated generally by the arrow 14. When the drill head 10 is removed from the drill hole, a counter-clockwise moment of force is generated in the opposite direction from arrow 14. As discussed previously, these forces can cause uneven wear on the bearing surface of a bearing and on the feed column 12.

Figure 2:
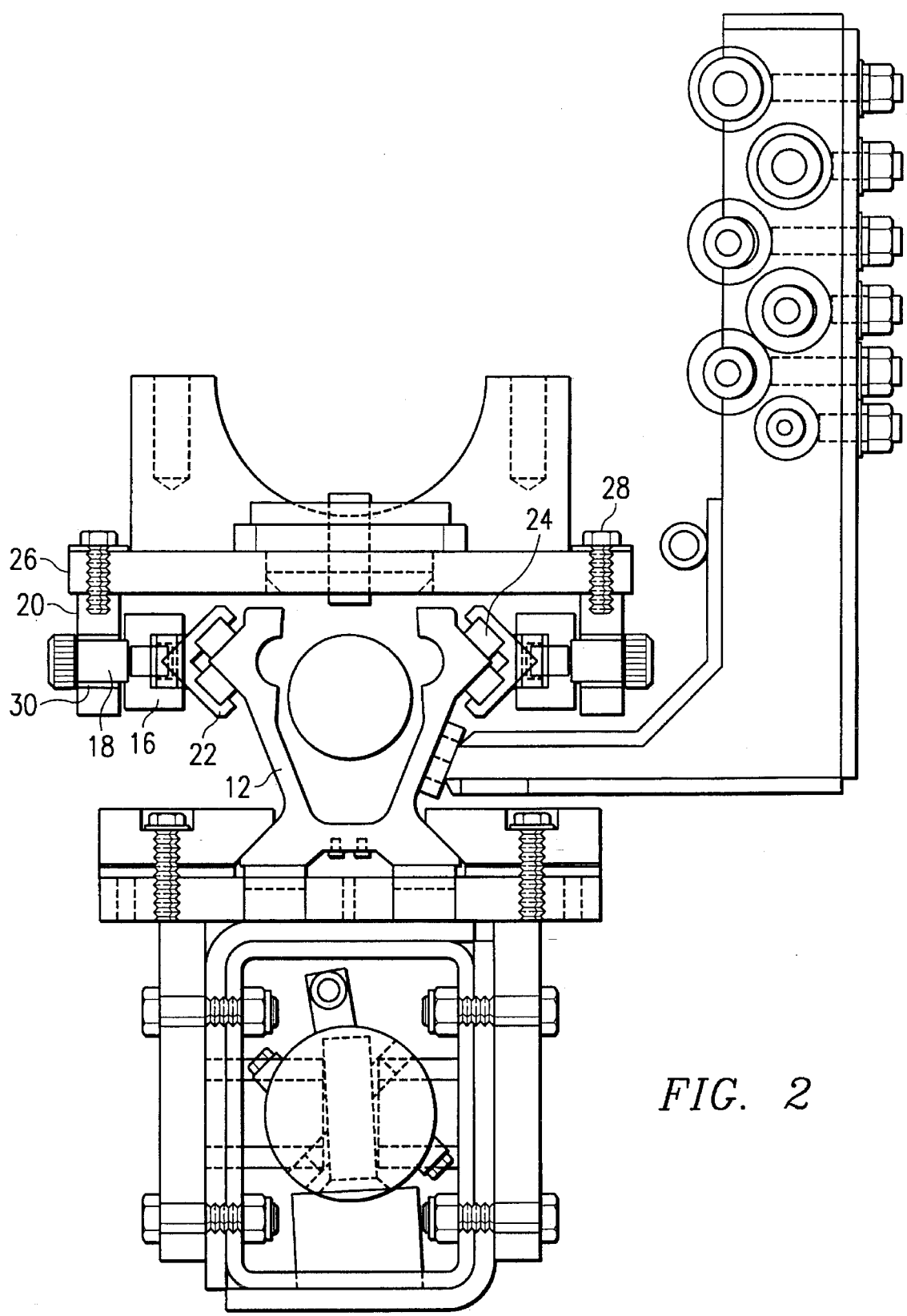

Referring now also to FIG. 2 there is illustrated an end view of the self-aligning linear bearings connecting a mounting plate 26 to a feed column 12. The bearings consist of a bearing block 16, pivot shaft 18, and pivot block 20. The bearing block 16 defines bearing surfaces 22 for engaging the feed column 12. In order to improve the wear characteristics of the bearing surfaces 22, bearing inserts 24 are inserted into the bearing surface. The pivot block 20 connects to the mounting block 26 by a bolt 28 and defines an opening 30 for receiving the pivot shaft 18. The pivot shaft 18 enables the bearing block 16 to rotate along the longitudinal axis of the drill head 10 and mounting plate 26. This enables the bearing surfaces 22 to maintain substantially full contact with the feed column 12. The pivot shaft 18 may comprise a shoulder bolt threaded into the bearing block 16 or any other means for providing a shaft sufficient to support the bearing block. While FIG. 2 illustrates an aluminum extrusion type feed column having a v-shaped guide track for retaining the mounting plate 26 to the feed column 12, the present invention may be modified to accommodate any other type of feed column commonly used in drilling operations, for example, a channel type feed column.

By placing the self-aligning linear bearings discussed herein at each of the four corners of a mounting plate 20 as shown in FIG. 1, the drill head 10 may rotate away from or toward the feed column 10 independently of the bearings at each corner of the mounting plate. Thus, the moment of force caused by the insertion or withdrawal of a drill head 10 do not cause the bearing surfaces 22 to misalign with the feed column 12. The substantially full contact maintained between the bearing surfaces 22 and the feed column 12 greatly reduces uneven or excessive wear on the bearing surfaces and feed column and greatly reduces the maintenance required for the feed and bearing mechanisms.

It should be appreciated by those skilled in the art that the specific embodiments disclosed above may be readily utilized as a basis for modifying or designing other structures for carrying out the purposes of the present invention. It should also be realized by those skilled in the art that such equivalent constructions do not depart from the spirit and scope of the invention as set forth in the appended Claims.

I claim:

1. A self-aligning linear bearing for use with a feed column of a drilling rig, comprising:

a bearing means for engaging the feed column; and means for rotatably connecting the bearing means to a mounting plate of a drill head such that the bearing means rotates along a longitudinal axis of the feed column with respect to the mounting plate.

2. The self-aligning linear bearing of claim 1 further including bearing inserts mounted within the bearing means for reducing wear between the bearing and the feed column.

3. The self-aligning linear bearing of claim 1 wherein the means for rotatably connecting further includes:

a pivot shaft extending from the bearing; and a pivot block connected to the mounting plate and defining an opening for rotatably engaging the pivot shaft.

4. A self-aligning linear bearing for use with a drilling rig, comprising:

a bearing having a bearing surface for engaging a feed column of the drilling rig; and means for rotatably connecting the bearing to a mounting plate of a drill head such that the bearing rotates along a longitudinal axis of the feed column to maintain substantially full contact between the bearing surface and the feed column.

5. The self-aligning linear bearing of claim 4 further including bearing inserts mounted within the bearing surface for reducing wear between the bearing surface and the feed column.

6. The self-aligning linear bearing of claim 4, wherein the means for rotatably connecting further includes:

a pivot shaft extending from the bearing perpendicular to the axis of rotation of the bearing; and a pivot block connected to the mounting plate and defining an opening for receiving the pivot shaft to enable rotation of the bearing.

7. A self-aligning linear bearing for use with a drilling rig, comprising:

a bearing having a bearing surface for engaging a feed column of the drilling rig;

bearing inserts mounted within the bearing surface for reducing wear between the bearing and the feed column;

a pivot shaft extending from the bearing; and a pivot block connected to a mounting plate of a drill head for rotatably engaging the pivot shaft.

* * * * *